June 28, 1960

H. H. DIETRICH ET AL 2,942,496

SUMMING MECHANISM

Original Filed Oct. 15, 1951

INVENTORS
Howard H. Dietrich
Clarence H. Jorgensen &
Willard J. Nickel
BY
Paul Fitzpatrick
ATTORNEY INVENTORS
Howard H. Dietrich,
Clarence H. Jorgensen &
Willard T. Nickel
BY Paul Fitzpatrick
ATTORNEY

United States Patent Office 2,942,496
Patented June 28, 1960

2,942,496
SUMMING MECHANISM

Howard H. Dietrich, Rochester, and Clarence H. Jorgensen, East Rochester, N.Y., and Willard T. Nickel, Flint, Mich., assignors to General Motors Corporation, Detroit, Mich., a corporation of Delaware Original application Oct. 15, 1951, Ser. No. 251,377, now Patent No. 2,852,913, dated Sept. 23, 1953. Divided and this application Aug. 8, 1958, Ser. No. 754,044

7 Claims. (Cl. 74—675)

This application is a division of application Serial No. 251,377, filed October 15, 1951, for Automatic Mechanism for Controlling Fuel Flow to a Jet Engine (Patent 2,852,913).

The invention to which this application is directed is a summing mechanism, the purpose of which is to provide a single output from a number of inputs. In the preferred embodiment of the invention described herein, the inputs are rotations of two shafts and linear movement of an input rod. The output is linear movement of an output rod. There is an additional input which is provided for adjustment or calibration purposes.

In the fuel control device disclosed and claimed in the parent application, the summing device receives inputs in the form of physical movements indicative of turbine temperature, turbine speed, and certain other factors which determine the proper fuel flow to a turbine engine, and the output of the summing mechanism controls a valve which regulates the supply of fuel to the engine.

The subject matter of this application may be understood without reference to the specific means which drive the inputs, and may be employed in machines of various kinds in which a number of inputs are added algebraically to provide an output. The principal object of the invention is to provide a simple, compact summing mechanism adapted to receive both rotary and linear inputs and to provide a rotary output which may be translated by the mechanism into a linear movement.

The nature of the invention and the advantages thereof will be clearly apparent to those skilled in the art from the succeeding detailed description of the preferred embodiment thereof and the accompanying drawings.

Figures 1, 2:
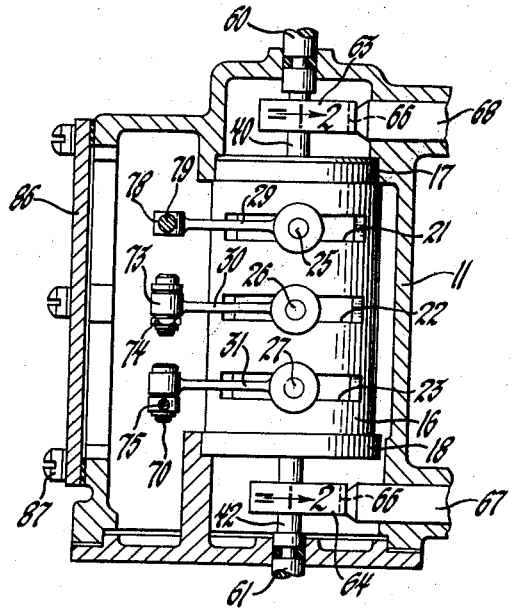
Figure 1 is a plan view, with certain parts in general horizontal section, of the summing device.
Figure 2 is a vertical section of the differential gear assembly thereof taken on the plane indicated by the line 2—2 in Fig. 1.
Figure 3:
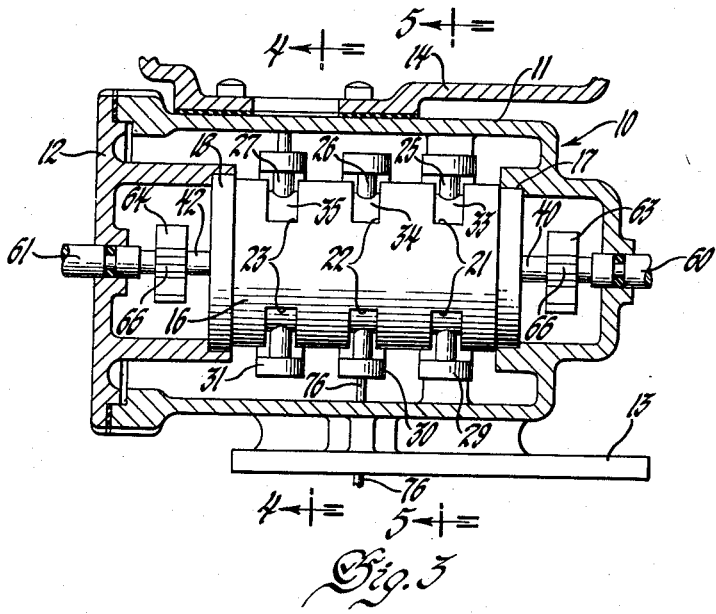
Figure 3 is an elevation view with certain parts in vertical section.

The summing mechanism is mounted in a housing 10 comprising a hollow case 11 and a cover 12 removably fixed to the case. A flange 13 on the case provides for mounting it on the case or housing of the device to be controlled. A case 14, shown fragmentarily, bolted to the upper side of case 11, may contain mechanism which provides one of the inputs to the summing mechanism. The principal parts of the summing mechanism are contained in a barrel 16, one end of which pilots at 17 into a recess in the case 11, and the other end of which has a flange 18 which pilots into a recess in the cover 12. Barrel 16 is provided with three sets of diametrically opposite slots 21, 22, and 23 which receive, respectively, pairs of rods 25, 26, and 27 attached, respectively, to yokes 29, 30, and 31. The pairs of rods 25, 26, and 27 pass, respectively, through sleeves 33, 34, and 35 fitted in barrel 16 and terminate in recesses provided by hub-blocks 37, 38, and 39. Sleeves 33, 34, and 35 may rotate about the axis of barrel 16.

The three hub-blocks have aligned holes which receive shafts 40 and 42 coaxial with barrel 16, which meet at the center plane of block 38. Shaft 40 is pinned to and drives a bevel sun gear 43 meshing with bevel planet gears or pinions 44 journalled on rods 25. Shaft 42 drives a bevel sun gear 46 meshing with bevel planet gears or pinions 47 journalled on rods 27. Bevel planet gears or pinions 48 are journalled on rods 26. A doublebevel sun gear 51 journalled on shaft 40 meshes with bevel gears 44 and 48 and a double-bevel sun gear 52 journalled on shaft 42 meshes with bevel gears 47 and 48. As will be apparent, the structure just described is a multiple planetary gear arrangement in which the rotation of each yoke 29, 30, or 31 around the axis of shafts 40 and 42 will be equal to one-half the sum of the rotations of the bevel gears coaxial with the shafts which mesh with the planet pinions on the respective yoke.

The multiple planetary gear structure is held assembled and end thrust bearings for the structure are provided by thrust washers 53 and 54 retained by rings 56 and 57 threaded into the ends of the barrel.

Shaft 40 may be driven by shaft 60 and shaft 42 by shaft 61. These shafts, as disclosed in the parent application, are driven by electric motors which are parts of mechanisms responsive to turbine speed and turbine temperature. So far as the present invention is concerned, the nature of the drive for shafts 40 and 42 is immaterial. Means may also be provided to lock shafts 40 and 42 in datum positions, comprising blocks 63 and 64 fixed to the shafts and having notches 66 which may receive plungers 67 and 68 with wedge ends. This structure is also immaterial to the present invention.

Figure 4:
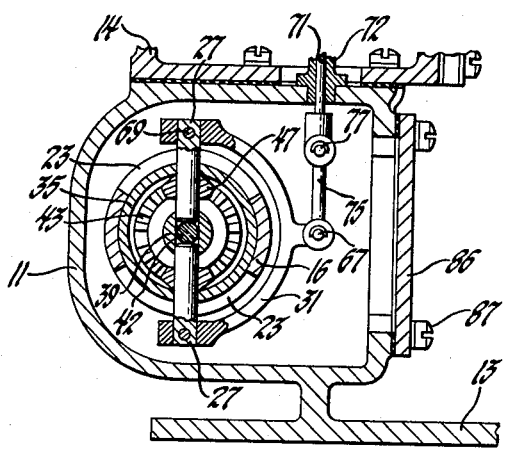
Figure 4 is a cross-section taken on the plane indicated by the line 4—4 in Figure 3.

It will be most clearly apparent from Figures 2 and 4 that the yokes 29, 30 and 31 are of semi-circular form and have aligned bores at each end to receive rods 25, 26, and 27 which are fixed to them by pins 69. The central point of each yoke provides means for receiving or transmitting motion. Referring to yoke 31 (Figs. 1 and 4), a pin 70 connects the midpoint of the yoke to a link 75 connected by pin 77 to a reciprocating rod 71 mounted in a bushing 72 in the case 11. Rod 71 extends into the case 14 where it may be moved vertically by mechanism responsive to certain conditions, the nature of which are presently immaterial. The center yoke 30 has an arm 73 extending from it connected by a pin to the clevised upper end 74 of a reciprocable rod 76 which provides the output of the summing mechanism and may, for example, operate a valve.

Figure 5:
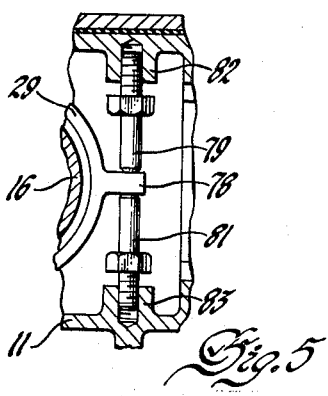
Figure 5 is a fragmentary view of a detail in the direction of arrows 5—5 of Figure 3.

The yoke 29 receives an input which may be provided for adjustment or calibration. A lug 78 (Figures 1 and 5) extending from the midpoint of yoke 29 is held between adjusting studs 79 and 81 threaded into bosses 82 and 83 in the case 11. A removable cover plate 86 is fixed to one side of case 11 by screws 87.

Proceeding to the operation of mechanism, shaft 42 is rotated by one input and yoke 31 by rod 71 providing a second input. Differential gears 46, 47, and 52 provide an algebraic summation of these two inputs. Rotation of shaft 40 provides a third input. Since yoke 29 is fixed, bevel gear 51 is driven to the same extent as shaft 40. The angular position of bevel gear 51 represents an algebraic summation of the input from shaft 40 and the adjustment set in by screws 79 and 81 through yoke 29 and planet gears 44. The motion of yoke 30 is the summation of the rotation of sun gears 51 and 52, through the differential action of planet gears 48. This rotation of yoke 30 is converted into the reciprocating motion of rod 76 which provides the final output of the mechanism.

It will be seen, therefore, that the structure illustrated provides an output which is an algebraic summation of four inputs, one of which, as shown, does not normally move except that it is shifted for alignment of the value of the output quantity with those of the input quantities. The yoke 29, however, could if desired be connected to any sort of operating device to provide a normally variable input.

It will be apparent that the preferred multiple differential gear structure is compact, simple, and easy to manufacture and assemble. Assemblies of different numbers of differential gear units may use the same parts, except for the barrel 16.

The detailed description of the preferred embodiment of the invention for the purpose of explaining the principles thereof is not to be construed as limiting or restricting the invention, as many modifications may be made by the exercise of skill in the art within the scope of the invention.

We claim:

1. A mechanical calculator comprising, in combination, a supporting member, aligned shafts extending within said member, a row of aligned bevel gears including two single-bevel gears, respectively, at the ends of the row and connected, respectively, with the shafts and also including two intermediate, double-bevel gears pivotally supported by the shafts; bevel pinions intermediate the bevel gears and, respectively, meshing with one end gear and an intermediate gear, with two intermediate gears, and with an intermediate gear and the other end gear, and three rods extending at right angles to the shafts and supported by the supporting member for rotation about the axis of the shafts and, respectively, pivotally supporting the bevel pinions, the rods and shafts transmitting the input and output movements of the calculator.

2. A mechanical calculator comprising, in combination a supporting member, aligned shafts extending within said member, a row of aligned bevel gears including two single-bevel gears, respectively, at the ends of the row and connected, respectively with the shafts and also including two intermediate, double-bevel gears pivotally supported by the shafts; bevel pinions intermediate the bevel gears and, respectively, meshing with one end gear and an intermediate gear, with two intermediate gears, and with an intermediate gear and the other end gear, three hub members located, respectively, between the bevel gears and pivotally supported coaxially of the shafts, and three rods extending at right angles to the shafts, and respectively, supported by the hub members and, respectively, pivotally supporting the bevel pinions, the rods extending from the hub member between the two double-bevel gears serving to transmit the output movement of the calculator, the shafts and the other rods being capable of receiving input movements.

3. A mechanical calculator comprising, in combination a supporting member, aligned shafts extending within said member, a row of aligned bevel gears including two single-bevel gears, respectively, at the ends of the row and connected, respectively, with the shafts and also including two intermediate, double-bevel gears pivotally supported by the shafts; bevel pinions intermediate the bevel gears and, respectively, meshing with one end gear and an intermediate gear, with two intermediate gears, and with an intermediate gear and the other end gear, three hub members located, respectively, between the bevel gears and pivotally supported coaxially of the shafts, three rods extending at right angles to the shafts and, respectively, supported by the hub members and, respectively, pivotally supporting the bevel pinions, and sleeves journalled in the supporting member for rotation about the axis of the shafts, the sleeves being disposed between the supporting member and the bevel pinions, the rods extending through the sleeves, and the supporting member having circumferential slots through which the rods extend.

4. A summing device comprising, in combination, a barrel having a cylindrical interior surface, input shafts coaxial with the barrel entering each end thereof, a plurality of sleeves journalled in the barrel, rods extending radially of the sleeves through the barrel and mounting planet gears on the sleeves internally of the sleeves, the barrel having circumferential slots through which the rods extend with freedom for movement around the axis of the shafts, a sun gear fixed on each said shaft meshed with the planet gears on the outermost sleeves, a sun gear rotatable about the axis of the shafts meshing with the planet gears of adjacent sleeves to provide a multiple planet gear set interconnecting all the sleeves, and external connecting means coupled to the rods externally of the barrel for movement around the axis of the shafts with the rods.

5. A summing device comprising, in combination, a barrel having a cylindrical interior surface, input shafts coaxial with the barrel entering each end thereof, a plurality of at least three sleeves journalled in the barrel, rods extending radially of the sleeves through the barrel and mounting planet gears on the sleeves internally of the sleeves, the barrel having circumferential slots through which the rods extend with freedom for movement around the axis of the shafts, a sun gear fixed on each said shaft meshed with the planet gears on the outermost sleeves, sun gears rotatable about the axis of the shafts each meshing with the planet gears of adjacent sleeves to provide a multiple planet gear set interconnecting all the sleeves, and external connecting means coupled to the rods externally of the barrel for movement around the axis of the shafts with the rods.

6. A summing device comprising, in combination, a barrel having a cylindrical interior surface, input shafts coaxial with the barrel entering each end thereof, a plurality of sleeves journalled in the barrel, rods extending radially of the sleeves through the barrel and mounting planet gears on the sleeves internally of the sleeves, the barrel having circumferential slots through which the rods extend with freedom for movement around the axis of the shafts, a sun gear fixed on each said shaft meshed with the planet gears on the outermost sleeve, a sun gear rotatable about the axis of the shafts meshing with the planet gears of adjacent sleeves to provide a multiple planet gear set interconnecting all the sleeves, external connecting means coupled to the rods externally of the barrel for movement around the axis of the shafts with the rods, and reciprocable members coupled to the connecting means.

7. A summing device comprising, in combination, a barrel having a cylindrical interior surface, input shafts coaxial with the barrel entering each end thereof, a plurality of at least three sleeves journalled in the barrel, rods extending radially of the sleeves through the barrel and mounting planet bevel gears on the sleeves internally of the sleeves, the barrel having circumferential slots through which the rods extend with freedom for movement around the axis of the shafts, a sun bevel gear fixed on each said shaft meshed with the planet gears on the outermost sleeves, sun bevel gears rotatable about the axis of the shafts each meshing with the planet gears of adjacent sleeves to provide a multiple planet gear set interconnecting all the sleeves, and external connecting means coupled to the rods externally of the barrel for movement around the axis of the shafts with the rods.

References Cited in the file of this patent

UNITED STATES PATENTS

| | | |
|---|---|---|
| 1,037,631 | Jones | Sept. 3, 1912 |
| 1,481,881 | Prince | Jan. 29, 1924 |
| 1,519,494 | Kent | Dec. 16, 1924 |
| 1,662,688 | Veber | Mar. 13, 1928 |
| 1,970,894 | Maag | Aug. 21, 1934 |
| 2,499,128 | Baunken | Feb. 28, 1950 |
| 2,443,159 | Fuerst | June 8, 1948 |